(12) United States Patent
Zafarana et al.

(10) Patent No.: US 6,583,608 B2
(45) Date of Patent: Jun. 24, 2003

(54) VOLTAGE/CURRENT CONTROLLER DEVICE, PARTICULARLY FOR INTERLEAVING SWITCHING REGULATORS

(75) Inventors: Alessandro Zafarana, Milan (IT); Claudia Castelli, Brugherio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 80 days.

(21) Appl. No.: 09/955,735

(22) Filed: Sep. 18, 2001

(65) Prior Publication Data

US 2002/0047694 A1 Apr. 25, 2002

(30) Foreign Application Priority Data

Sep. 19, 2000 (IT) .......................... MI20A2042

(51) Int. Cl.[7] ................................ G05F 1/40
(52) U.S. Cl. ..................................... 323/282
(58) Field of Search ................ 323/265, 268, 323/270, 271, 275, 276, 277, 280, 282, 284, 285

(56) References Cited

U.S. PATENT DOCUMENTS

| | | | | |
|---|---|---|---|---|
| 5,973,936 A | * | 10/1999 | Lenz et al. | 363/15 |
| 6,396,311 B2 | * | 5/2002 | Inn | 327/70 |
| 6,465,994 B1 | * | 10/2002 | Xi | 323/274 |
| 6,492,845 B1 | * | 12/2002 | Ge et al. | 327/53 |

* cited by examiner

*Primary Examiner*—Matthew Nguyen
(74) *Attorney, Agent, or Firm*—Lisa K. Jorgenson; Robert Iannucci; Seed IP Law Group PLLC (57) ABSTRACT

A voltage/current controller device, particularly for interleaving switching regulators, comprises: a DC/DC converter having a plurality of modules, with each module including a drive transistor pair connected in series between first and second supply voltage references, a current sensor connected to one transistor in the pair, and a current read circuit connected to the sensor. Advantageously, the read circuit comprises a transconductance amplifier connected across the current sensor to sense a voltage signal related to a load current being applied to each module, the transconductance amplifier reading the voltage signal with the transistor in the conducting state.

18 Claims, 9 Drawing Sheets

VOLTAGE/CURRENT CONTROLLER DEVICE, PARTICULARLY FOR INTERLEAVING SWITCHING REGULATORS

BACKGROUND OF THE INVENTION

1. Field of the Invention

The present invention relates to a voltage/current controller device, particularly for interleaving switching regulators.

Specifically, the invention relates to a controller device as above, which comprises a DC/DC converter having a plurality of modules, each module including a pair of drive transistors connected in series between first and second supply voltage references, a current sensor connected to one transistor in said pair, and a current reading circuit connected to said sensor.

The invention relates, particularly but not exclusively, to a controller device for switching regulators of the interleaving type as used in computer processors, this description making reference to this field of application for convenience of illustration only.

2. Description of the Related Art

As is well known, developments in the electrical characteristics of computer processors, e.g., PC, WORKSTATION, and SERVER, are compelling the manufacturers to seek new solutions in order to meet the requirements of central processing units (CPUs).

In particular, CPUs require an accurately adjusted supply voltage (±0.8% at steady state, ±3% in transient conditions).

However, supply voltages as low as 1.1 V, and load currents of up to 100 A, with 100 A/µs edges, are used at present. This requires a higher efficiency than 80%.

So it is that current or voltage control devices must be employed, which can assure of the necessary efficiency. To fill the above demands, a low-cost device of this kind may comprise an interleaving type of DC/DC converter, for example.

In particular, this converter layout is obtained by connecting in parallel N DC/DC converters in a step-down configuration, i.e., with the voltage input and output connected together. Each DC/DC converter is referred to as the "module" or "channel".

An interleave configuration needs a synchronization circuit to close the high-side switches of the converter modules with a phase shift equal to the switching period divided by the number N of modules.

For simplicity, reference will be made hereinafter to a DC/DC converter having two interleaving modules.

It should be noted that when a conventional voltage mode control is applied to an interleaving type of converter, an uncontrolled distribution of the currents flowing through the inductors of the parallel modules is produced. Thus, to perform satisfactorily, the converter requires that the total load current be split equally among the modules, i.e., that each module carried a current equal to the target output current divided by N. This control technique is known as "current sharing".

Additionally to said current-sharing option, interleaving DC/DC converters are required to vary the output voltage level proportionally to the target output current. In other words, with Vout,nom being the rated output voltage, i.e., the voltage value when the converter is outputting no current, and Iout being the value of the output current, the output voltage level Vout is given as:

Vout=Vout,nom−out*K, where K is a factor decided upon outside the converter.

This option is known as "voltage positioning" or "droop function".

Conventional converter devices with current-sharing and droop function options are available commercially in several different types.

Such options involve the need for a converter operative to read or estimate the output current from each module. In particular, the DC/DC converter is to include a read circuit arranged to read this module current by the voltage drop across an output resistor. This resistor may be parasitic to the circuit, e.g., the power switch resistance Rds,on or the DCR of an inductor, or be an element deliberately introduced in the read circuit and usually designated Rsense.

Using a dedicated resistive element Rsense is advantageous in that the reading obtained is highly accurate and unaffected by temperature (e.g., using resistors made of constantan). It has, however, the disadvantages of being expensive and providing a less efficient current-to-voltage conversion within the converter.

On the other hand, utilizing a parasitic element inside the read circuit is surely more cost-efficient, since existing elements in the read circuit can be used. However, this solution lowers reading accuracy because it responds to both manufacturing variations and operating temperatures.

Illustrated schematically by FIGS. 1 to 4 are different conditions in the operation of an interleaving DC/DC converter according to the prior art.

Assume for simplicity the target output current Iout to have been split equally among the N converter modules.

Figure 1:
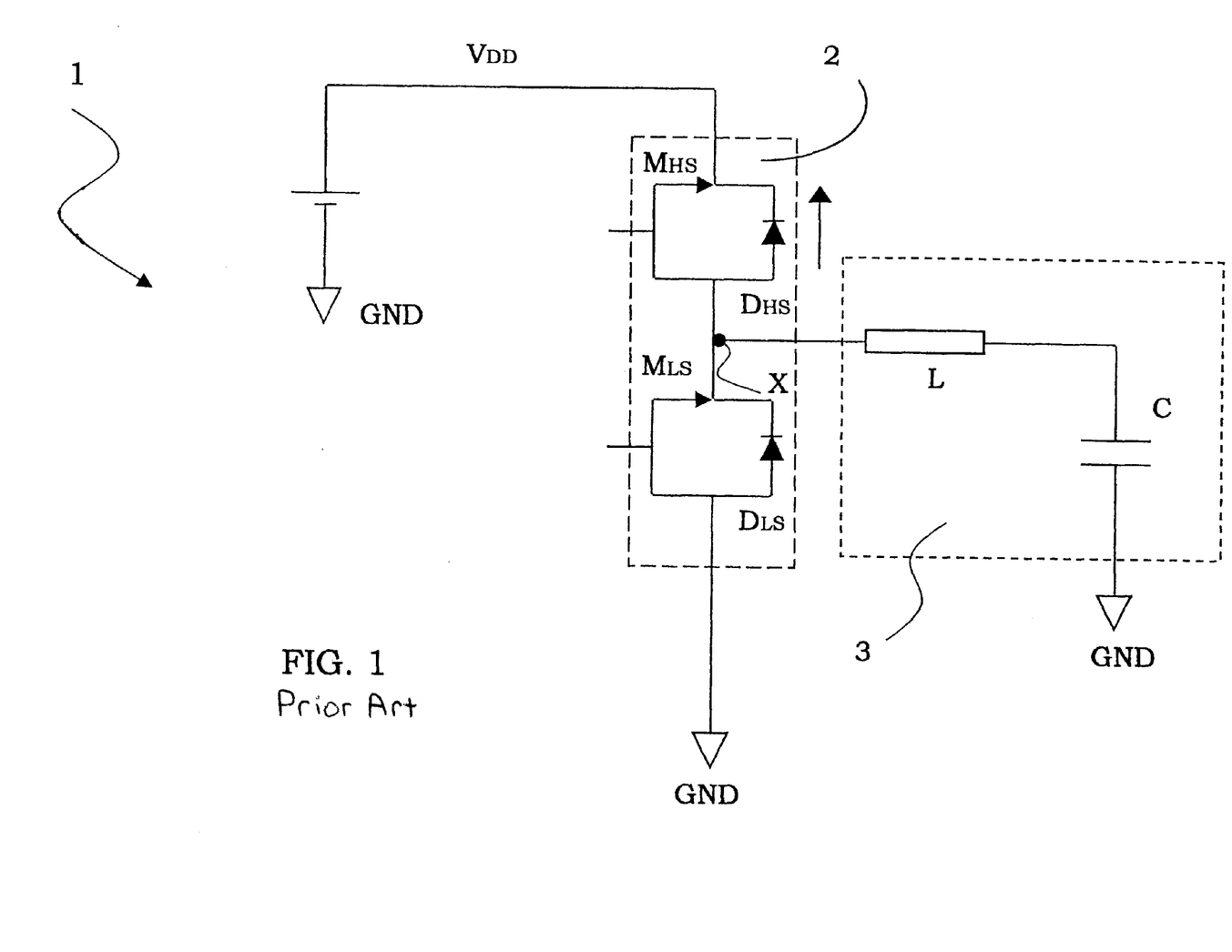
FIGS. 1 to 4 illustrate schematically respective working conditions of voltage controller devices that incorporate interleaving switching DC/DC converters according to the prior art.

FIG. 1 shows schematically an interleaving DC/DC converter 1 that comprises at least one module 2, in turn comprising a high-side transistor $M_{HS}$ and a low-side transistor $M_{LS}$ connected in series together between a first or supply voltage reference VDD and a second or ground voltage reference GND. The module 2 is connected to a load comprising a network 3, in turn connected between a terminal X intermediate the transistors $M_{HS}$, $M_{LS}$ and ground GND.

This network 3 comprises a series of an inductor L and a capacitor C.

Illustrated schematically in FIG. 1 is a working condition in which the reading performed is a current reading effected across the drain and source terminals of the high-side transistor $M_{HS}$.

In this case, the reading is little dissipative. Being Iout,2 the average current from any module 2, i.e., the average current through the inductor L in the network 3, the power dissipated through the DC/DC converter 1 having N modules will be:

D*N*Rds,on*(Iout,2)² where D is the ratio of the output voltage value Vout to the value of the supply voltage VDD of the DC/DC converter 1 (D=Vout/Vin). The ratio D is, therefore, quite small, in particular between 1 V/12 V and 1.85 V/12 V.

In conventional converters, the high-side transistor $M_{HS}$ will close for a time duration D*Ts (where Ts is the switching period of the converter 1). This duration is very small, however.

Also, when the high-side transistor $M_{HS}$ closes and its source terminal reaches a value equal to an input voltage Vin, the reading becomes injured by noise from capacitive coupling effects.

All this makes for difficult reading.

Figure 2:
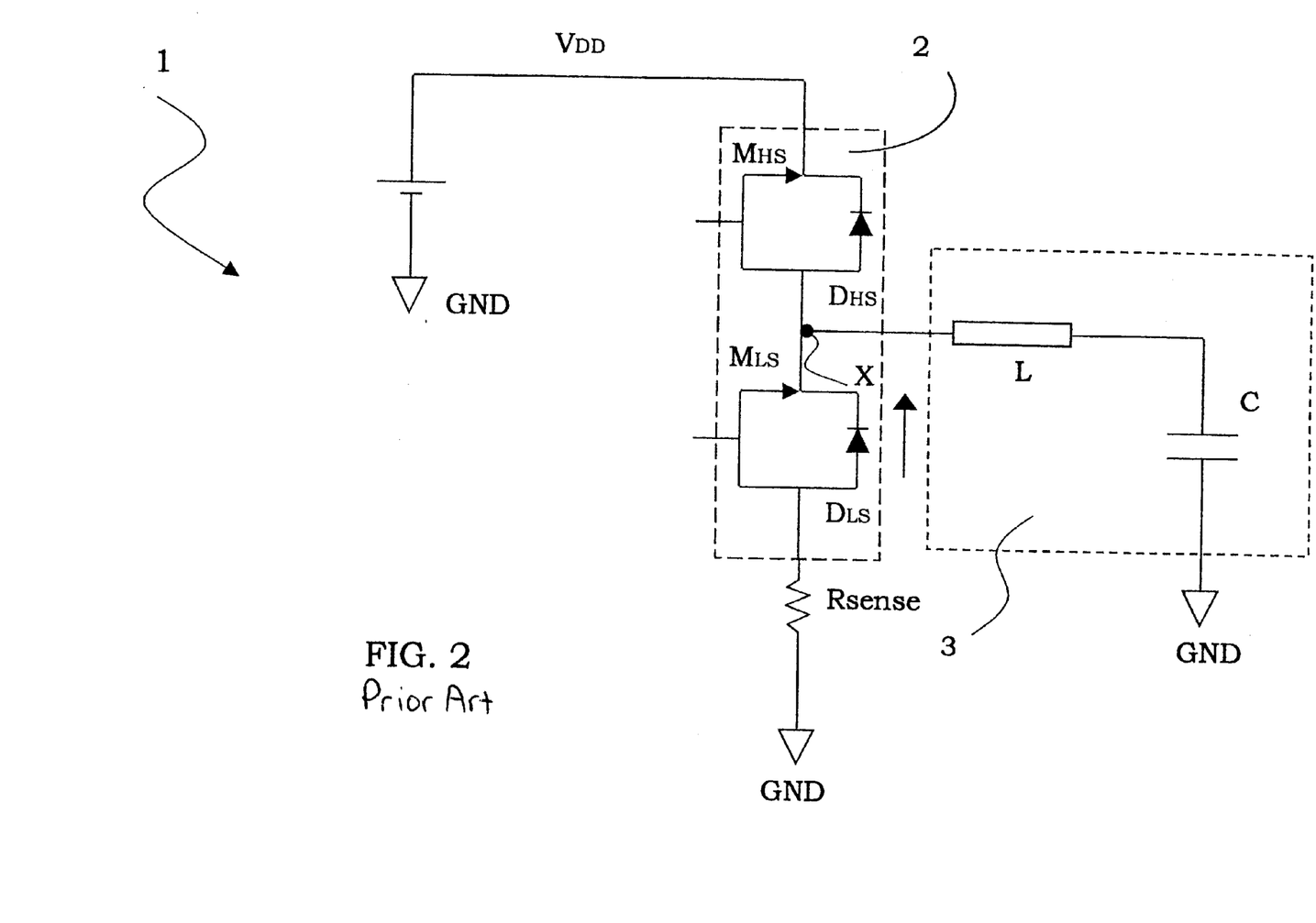

FIG. 2 likewise shows a working condition in which a current reading is performed across the drain and source terminals of the low-side transistor $M_{LS}$.

In this case, the reading is little dissipative, and the power dissipated is:

$$N*Rds,on*(1-D)*[Iout,2]^2.$$

The low-side transistor $M_{LS}$ will close for a time duration (1−D)*Ts. This time allows a reading to be completed even with conventional converters. For example, a resistive element Rsense in series with the low-side transistor $M_{LS}$ may be used.

Figure 3:
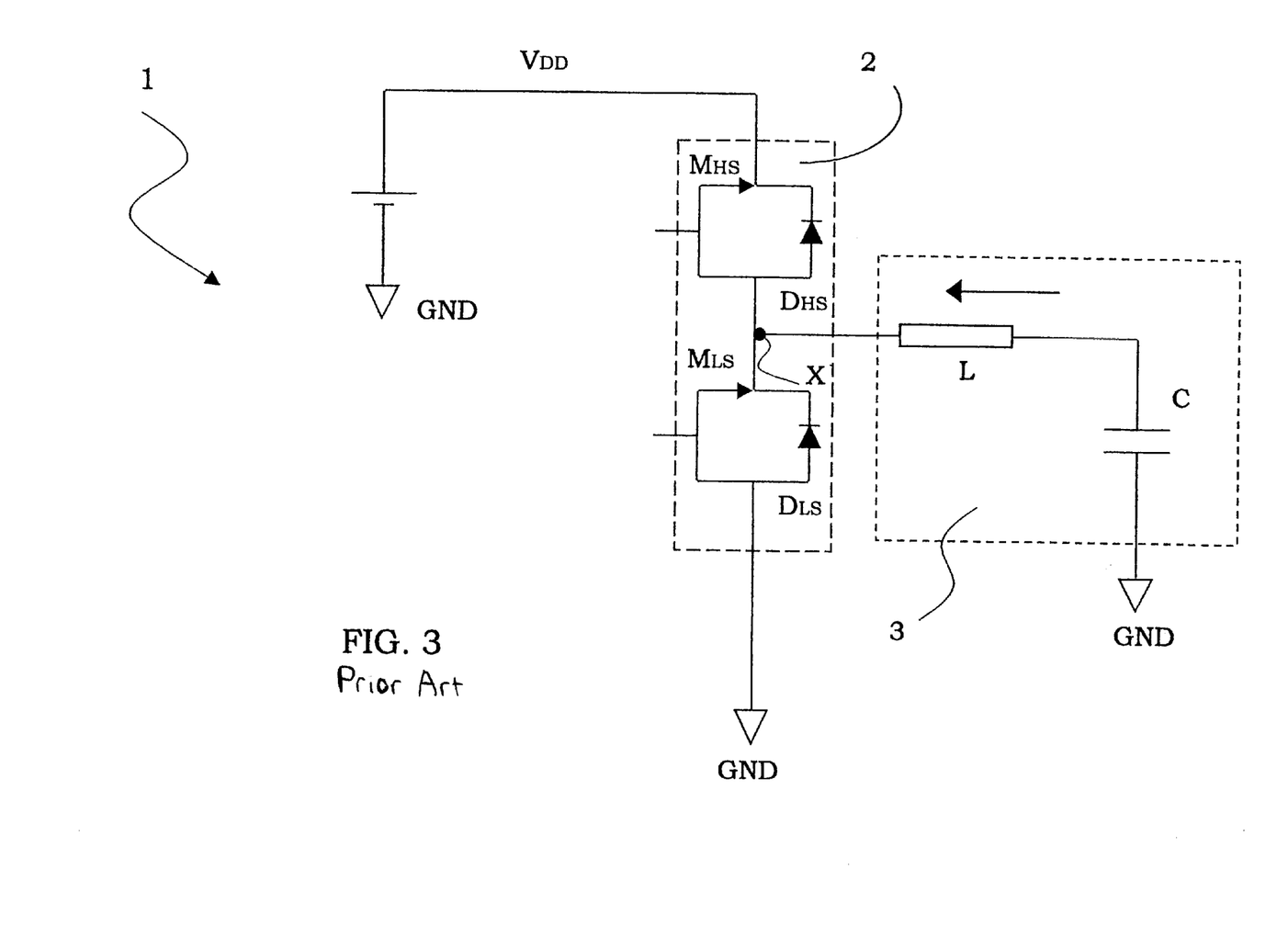

FIG. 3 shows schematically a working condition in which a current reading is performed across the inductor L of the network 3.

In this case, the reading is dissipative, the power dissipated being:

$$N*DCR*Iout,2^2$$

where DCR is the equivalent resistance of the inductor L in the network 3.

It should be noted, however, that the intermediate node X, being connected to one end of the inductor, would exhibit voltage values within the range of ground reference GND to input voltage Vin. Thus, the reading must be made by filtering the voltage signal at the node X to extract continuous information. This filtering introduces new components, and injures the overall speed of the DC/DC converter 1.

To obviate this, it has been known to use a dedicated resistive element Rsense (not shown) in series with the inductor L.

Figure 4:
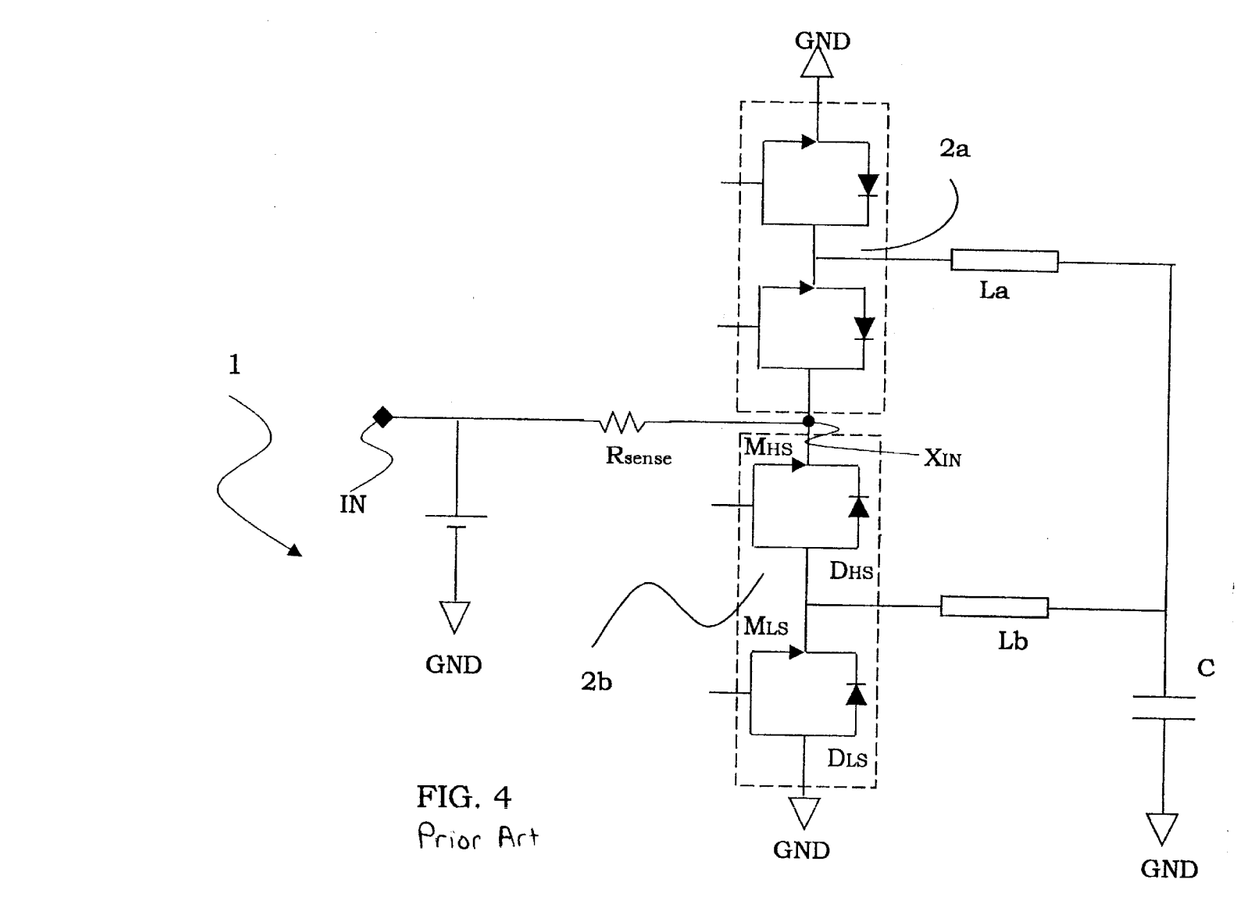

Likewise in FIG. 4, a working condition in which an input current reading to the DC/DC converter 1 is performed.

In particular, an input terminal IN of the DC/DC converter 1 is connected to an input node XIN through a dedicated resistive element Rsense, with the node XIN being connected to first and second modules, 2a and 2b. These modules 2a, 2b have corresponding high-side transistors $M_{HS}$, corresponding low-side transistors $M_{LS}$, and respective networks formed, for simplicity, of a single capacitor C and respective inductors La and Lb.

In this case, the reading is little dissipative. Being Iout,i the average current from the generic i-th module, the power dissipated will be:

$$Rsense*D*N*(Iout,i)^2.$$

The differential signal across the dedicated resistive element Rsense will always be a low voltage value, but the measuring time will be quite short (equal D*Ts) and compel use of the dedicated resistive element Rsense.

The above discussion of different working conditions clearly shows that a controller with current sharing and droop function options, i.e., adapted for use in an interleaving regulator, can only be obtained when a current reading is performed across the drain and source of the low-side transistor $M_{LS}$, such as shown in FIG. 2 for example.

BRIEF SUMMARY OF THE INVENTION

An embodiment of this invention provides a voltage/current controller device with appropriate structural and functional features for efficient reading, specifically low-dissipation reading, and that overcomes the limitations of prior devices.

An embodiment of this invention uses a read circuit that can correctly read, with low dissipation, a signal appearing at a suitable sensor and being related to the load on the controller device.

An embodiment of this invention provides a controller device comprising: a DC/DC converter having a plurality of modules, with each module including a drive transistor pair connected in series between first and second supply voltage references, a current sensor connected to one transistor in said pair, and a current reading circuit connected to said sensor. The read circuit comprises a transconductance amplifier connected across the current sensor to sense a voltage signal related to a load current being applied to each module, said transconductance amplifier reading said voltage signal with said transistor in the conducting state.

The features and advantages of a controller device according to the invention will be apparent from the following description of an embodiment thereof, given by way of non-limitative example with reference to the accompanying drawings.

DETAILED DESCRIPTION OF THE INVENTION

Figure 5:
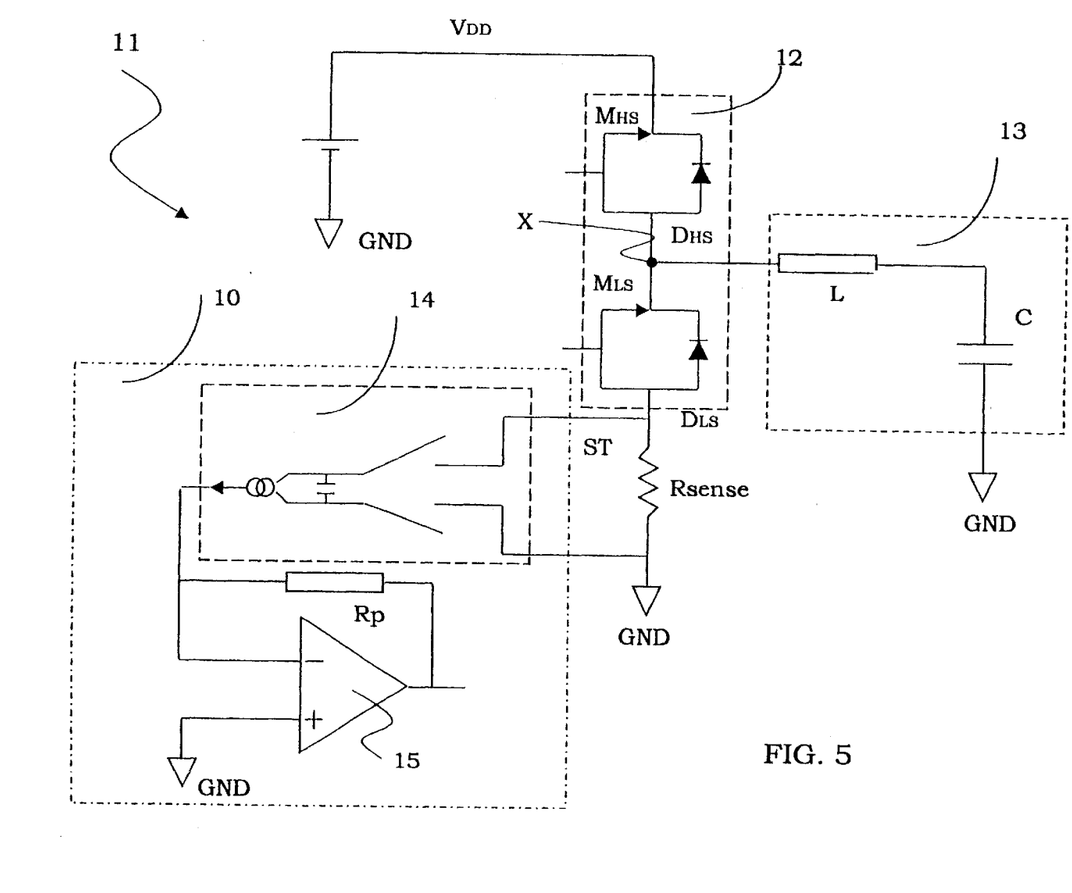
FIG. 5 shows schematically a controller device according to the invention.

With reference to the drawings, shown schematically in FIG. 5 is a voltage/current controller device according to this invention. This controller device comprises essentially an interleave type of DC/DC converter 11 that includes a plurality of modules 12 and a read circuit 10.

Only one module 12 will be described for simplicity. The module 12 comprises a transistor pair connected between a first voltage reference being a supply voltage VDD and a second voltage reference being a ground voltage GND.

The module 12 comprises a high-side transistor $M_{HS}$ and a low-side transistor $M_{LS}$, which transistors are connected in series with each other to said first or supply voltage reference VDD. An intermediate circuit node X, interconnecting said transistors, is connected to ground GND through an LC network 13 comprising a series of an inductor L and a capacitor C.

Diodes $D_{LS}$ and $D_{HS}$ are connected between the conduction terminals of the transistors $M_{LS}$ and $M_{HS}$. In practice, these diodes $D_{LS}$ and $D_{HS}$ may be the intrinsic diodes of the MOS transistors $M_{LS}$ and $M_{HS}$.

A current sensor, such as a read resistor Rsense having the read circuit 10 connected across it, is connected serially to the low-side transistor $M_{LS}$.

It should be noted that the read circuit 10 could be connected across the low-side transistor $M_{LS}$ directly. In this case, the current sensor Rsense would be the equivalent resistor Rds, on of the low-side transistor $M_{LS}$.

Thus, the reading performed will be theoretically non-dissipative, and cost nothing. In practice, however, account should be taken of variations in the fabrication process of the low-side transistor $M_{LS}$ being apt to introduce minor amounts of dissipation.

Advantageously, the read circuit 10 comprises a track-and-hold transconductance amplifier 14 connected across the current sensor, i.e., the read resistor Rsense. The amplifier 14 is further connected to an inverting (−) input terminal of an error amplifier 15, which error amplifier has a non-inverting (+) input terminal connected to ground GND, and has an output terminal feedback-connected to the inverting input terminal through a bias resistor Rp.

The read circuit 10 allows a voltage signal ST to be sensed across the read resistor Rsense. This voltage signal ST is the voltage between the drain and source terminals of the low-side transistor $M_{LS}$. The use of the read circuit 10 in the other working conditions previously described in relation to the state of the art is readily inferable.

Information about the load current applied to the module 12 is obtained from the voltage signal ST as picked up at the drain and source terminals of the low-side transistor $M_{LS}$. Therefore, the voltage signal ST can only be read with the transistor $M_{LS}$ in a conductive state.

However, proper operation of the read circuit 10 requires that the reading of the voltage signal ST be interrupted while:

the high-side transistor $M_{HS}$ is conducting; and the diodes $D_{LS}$ and $D_{HS}$, corresponding to intrinsic diodes for synchronous MOS transistors, are conducting.

For minimum noise, it is also advisable to discontinue reading during the on/off switching of the low-side transistor $M_{LS}$.

This reading control is advantageously implemented in this invention by the read circuit 10 including a track-and-hold transconductance amplifier 14.

Figure 6:
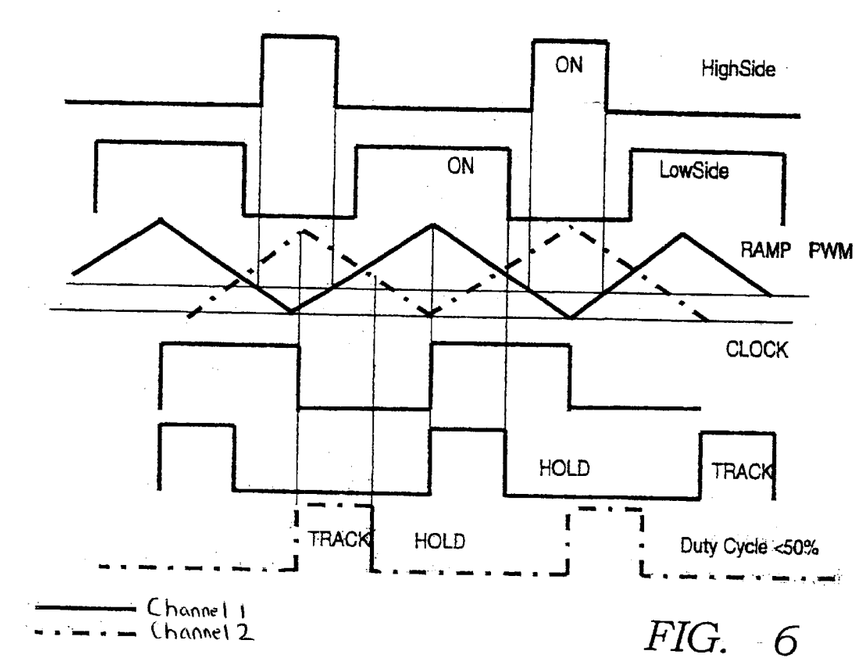
FIGS. 6 and 7 show schematically plots against time of internal signals of the controller device of FIG. 5.

To minimize noise from the MOS transistor switching, the track and hold phases of the transconductance amplifier 14 should be carefully selected, as shown schematically in FIG. 6.

In particular, the track or updating signal is generated by combining the control signal to the low-side transistor $M_{LS}$ and a clock signal to the channel of module 12. These control and clock signals may be combined in a logic operator such as an AND gate.

Thus, the updating will occur long after the low-side transistor $M_{LS}$ is turned on, and the noise involved will not affect reading.

The low-side transistor $M_{LS}$ is turned off after the off command (LowSide=0), and while the reading is in the ensuing hold phase. Thus, not even the switching off of the low-side transistor $M_{LS}$ will affect reading.

A triangular signal PWM is obtained at the output of the error amplifier 15.

It should be considered that there are at least two interleaved channels per DC/DC converter 11, their phase shift being Ts/2, as shown by the dash-and-dot curves in FIG. 6. For example in CPU applications, the read circuit 10 always has a duty cycle of less than 50%, even during transients when the supply is 12 V.

Furthermore, the track-and-hold transconductance amplifier 14 provided effectively averts noise from the second channel switching as the first channel is being read.

The operation of the read circuit 10 will now be described.

With the low-side transistor $M_{LS}$ 'on', the read circuit 10 supplies a value equaling that stored at the end of the previous switching period (hold phase).

The information is updated from time Ts/2 to time Ts (track phase). The reading is updated at each switching cycle by the provision of a top limit in the duty cycle.

Figure 7:
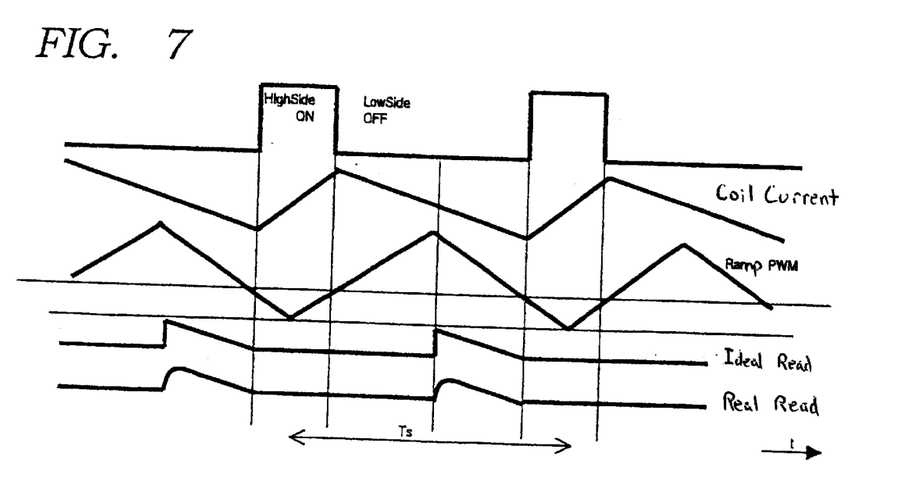

The read circuit 10 is also fast enough to track the shape of the current signal being passed through the low-side transistor $M_{LS}$, as shown in FIG. 7. This allows the signal to exhibit a peak that is half the current ripple in the inductors L of the modules 12 of the converter 11. Accordingly, this signal will require no further filtering stages, which filtering stages invariably offset the loop transfer function of the converter 11, complicating the study of the system overall stability.

The read circuit 10 curtails, therefore, the number of external components required by its respective DC/DC converter 11. The absence of filters, moreover, makes for fast current sharing even during transients.

At each switching cycle, read updating is assured by the introduction of a limitation to the maximum duty cycle that the DC/DC converter 11 is allowed.

Finally, the MOS transistor switching noise is minimized by suitably selecting the track and hold phases for the transconductance amplifier 14.

The read circuit 10 can serve several functions of its respective DC/DC converter 11, making the latter suitable for the applications specified in connection with the state of the art.

Figure 8:
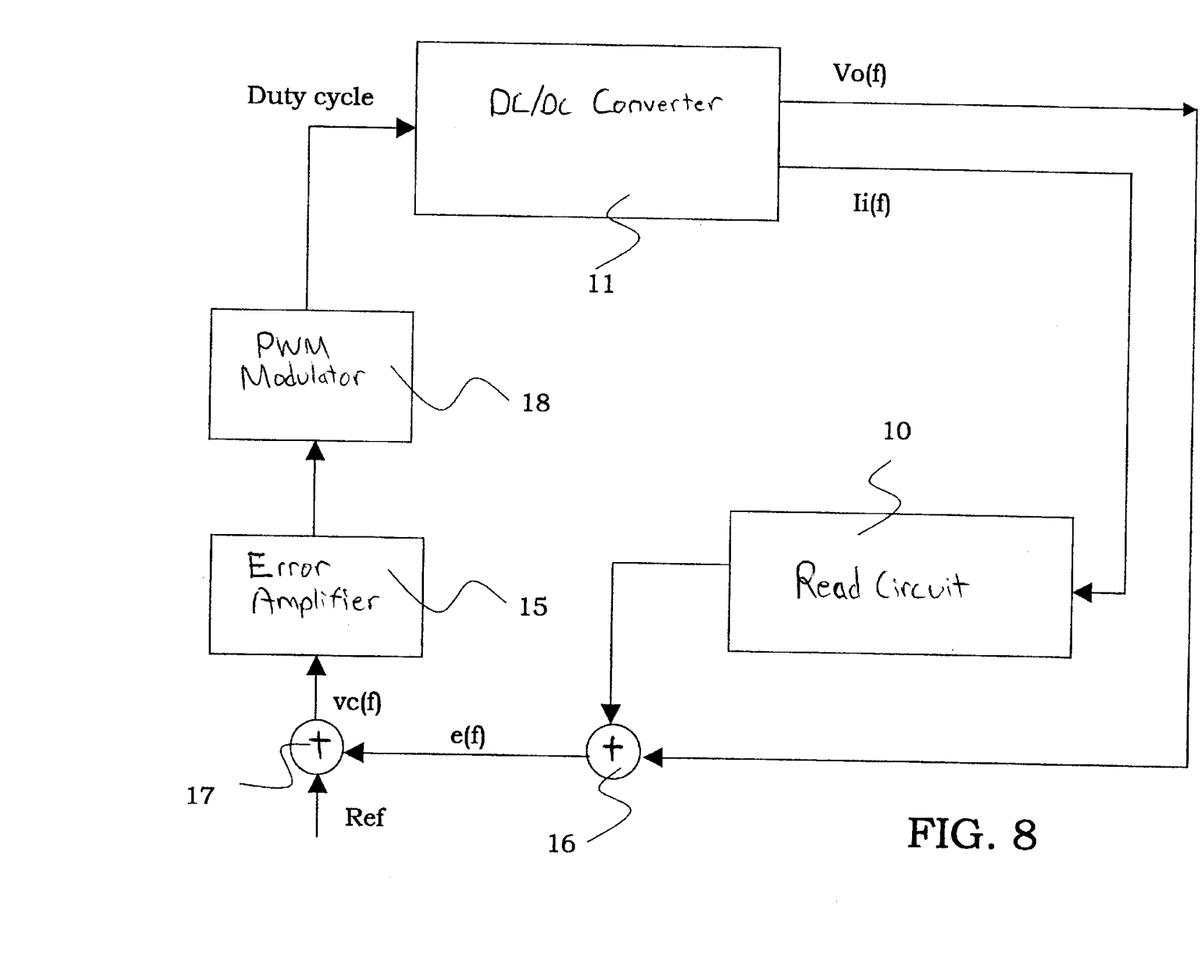
FIG. 8 shows schematically a modified embodiment of a controller device according to the invention.

Shown schematically in FIG. 8 is a modified embodiment of a controller device according to the invention, which again comprises a DC/DC converter 11, and adapted to implement the average current mode.

The output voltage from the DC/DC converter 11 is regulated to assure a fast response to load variations and adequate current sharing during transients.

In particular, each module 12 in the DC/DC converter 11, corresponding to one channel, has its output connected to a read circuit 10 and supplies the latter with a current signal li(f).

The read circuit 10 is further connected with its output to a summing node 16, the latter being also input the output voltage Vo(f) from each channel of the DC/DC converter 11. The result e(f) is a first-order estimate of the load current of the DC/DC converter 11, and is passed to an another summing node 17 that is input a reference signal Ref.

The output signal from this summing node 17 is input to the series of the error amplifier 15 and a PWM modulator 18 adapted to supply a duty cycle signal to the DC/DC converter 11.

The reading performed by the read circuit 10 is processed in the DC/DC converter 11 to obtain an error amplifier output voltage in the frequency domain given as:

$$vc(f)=Zf/Zi*vo(f)-Zf*k*\Sigma i\ Rsense*li(f)$$

where:

vs(f) is the control voltage of the PWM modulator 18, vo(f) is the output voltage of each module or channel 12, Zf is the output-to-inverting (−) terminal impedance of the error amplifier 15, Zi is the inverting (−) terminal-to-output voltage impedance of the error amplifier 15, and li(f) is the current sampling of the i-th module.

It should be noted that, in the frequency range of interest, i.e., between 0 and Fs/10 (where Fs is the switching frequency, i.e., the rate at which the DC/DC converter 11 switches over the modules 12), the value of the impedance Zf is sufficiently high to produce a major variation in the value vc and, hence, the duty cycle value. In addition, the signal li(f) has harmonic contents that is almost fully encompassed by the same interesting range.

In this way, the DC/DC converter 11 will use the current information from the read circuit 10 to determine the duty cycle, thereby functioning as a conventional current-mode controller.

The DC/DC converter 11 is provided stability by an additional compensation network (not shown) being connected between the output and inverting (−) terminals of the error amplifier 15. In general, a series of capacitor and a resistor will do.

Figure 9:
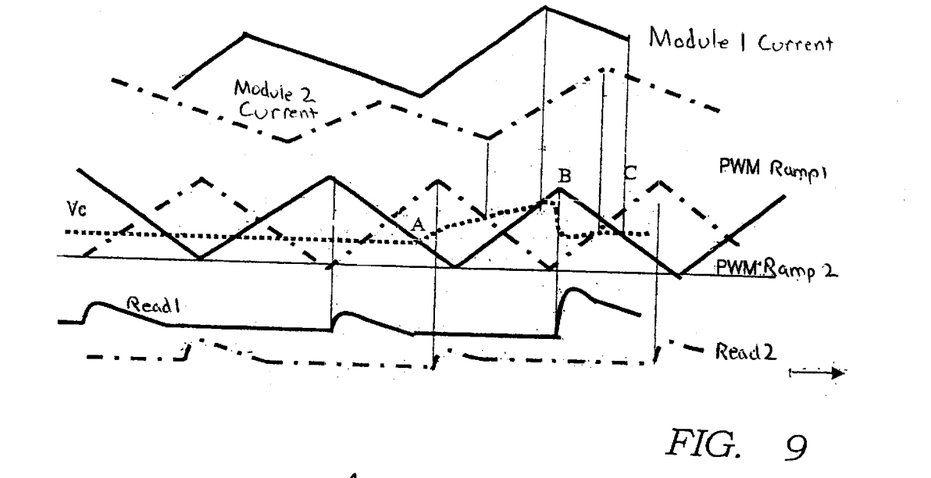
FIG. 9 shows schematically internal signals of the controller device of FIG. 8 plotted against time.

During transients, current sharing is achieved by the value Vc varying in consequence of the current of each module 12 and corresponding PWM ramp being read as shown in FIG. 9.

With reference to FIG. 9, assume two modules 12a and 12b to have different inductance values. During a load transient, the inductor currents will rise with different gradients, e.g., the current of module 12a may rise quicker than the current of module 12b.

Thus, the duty cycle, or just the same the control voltage Vc, will rise between a time A and a time B because of the error produced between the output voltage Vout and the reference voltage Ref. This is what is meant by the voltage mode. A measurement of current in the inductor is made between a time B and a time C. The greater the current variation the lower becomes the control voltage Vc, so that the time taken to turn off the low-side transistor $M_{LS}$ of the module 12a is lengthened.

However, too deep a filtering of the current readings would give a variation in the control voltage Vc that is only dependent on the error. In this case, the modules 12a, 12b would receive the same duty cycle, and it would be impossible to compensate for the current error between the modules 12a and 12b.

Figure 10:
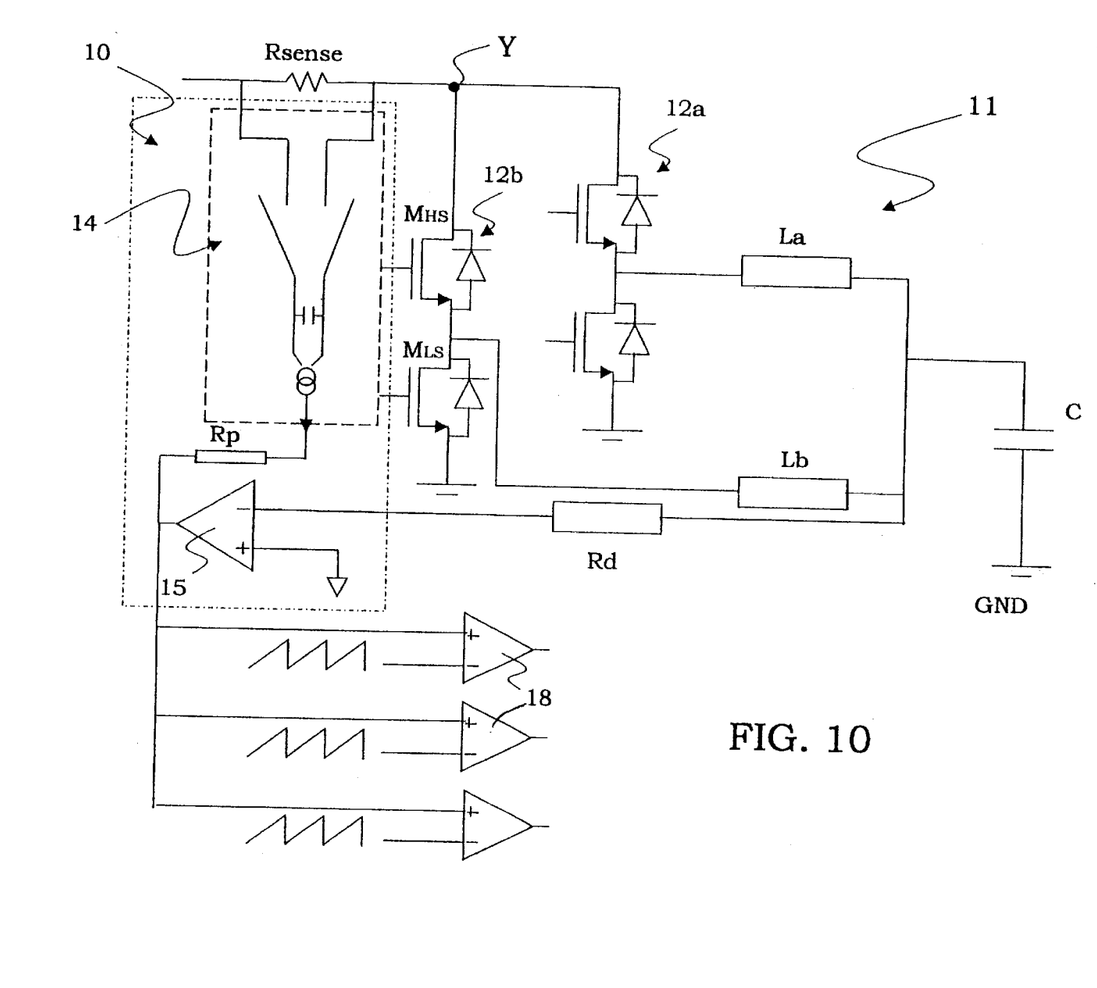
FIG. 10 shows schematically another modified embodiment of a controller device according to the invention.

FIG. 10 shows schematically another modification of the controller device according to the invention, which comprises a DC/DC converter 11 and a read circuit 10 for the signal across the drain and source terminals of the high-side transistors $M_{HS}$ of the modules of the DC/DC converter 11.

In particular, the DC/DC converter 11 comprises at least first and second modules, 12a and 12b, connected in parallel with each other between a circuit node Y and a ground GND, said modules having respective high- and low-side transistors, as well as respective inductors taken to ground through a common capacitor.

The interconnect node Y is connected to the supply reference VDD through a current sensor, e.g., a read resistor Rsense.

Advantageously, the read circuit 10 connected across the current sensor Rsense comprises a track-and-hold transconductance amplifier 14, and an error amplifier 15 having its output fed back to the inverting (−) input terminal through a bias resistor Rp.

The inverting (−) terminal is additionally connected to the first and second modules 12a and 12b through a decoupling resistor Rd.

Finally, the controller device comprises a plurality of PWM modulators 18.

Thus, the reading is performed on the input of the DC/DC converter 11 and updated (tracking phase) each time that the high-side transistor $M_{HS}$ of the modules 12a,b is turned on.

Figure 11:
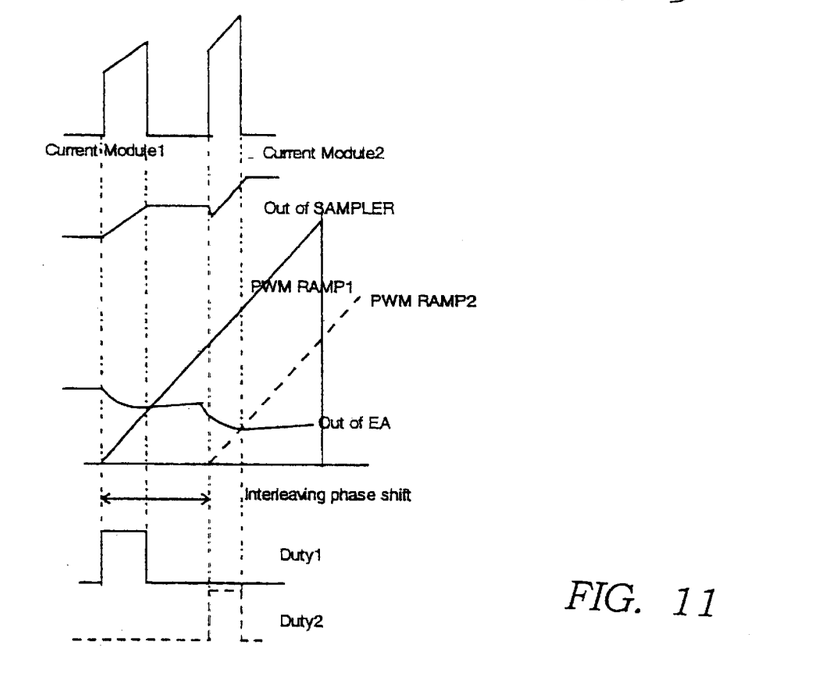
FIG. 11 shows schematically internal signals of the controller device of FIG. 10 plotted against time.

FIG. 11 shows signal waveforms of the DC/DC converter 11 picked up from an internal circuit node Y connected to one end of the current sensor Rsense as shown in FIG. 10. In particular a signal Out-of-Sampler is the current signal being injected into the error amplifier 15 through its inverting (−) terminal.

A signal Out-of-EA is the control voltage Vc, which voltage controls a reduction in the duty cycle (and hence, the module current) of the channel that is conducting the largest current.

The controller device of FIG. 10 has, moreover, the features listed here below.

Droop function: the information comprising the sum of the current readings (DC values) is used to shift the reference for the loop containing the error amplifier 15 proportionally to the load.

Average Current Sharing: the current information for each module is compared with the mean value of the currents to correct the loop control read voltage Vc of each channel. Thus, unbalance between channels can be corrected and the output currents equalized.

Current Limit: the unfiltered instant current information allows prompt and accurate troubleshooting. A comparator will be added to the DC/DC converter 11 in order to compare the reading and a reference with each other. In this case, the reading is constantly updated (by the provision of a top limit in the duty cycle) and the check on current can be made at each cycle.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A voltage/current controller device, comprising:
a DC/DC converter having a plurality of modules, with each module including a drive transistor pair connected in series between first and second supply voltage references, a current sensor connected to one transistor in said pair, and a current reading circuit connected to said sensor, said reading circuit including a transconductance amplifier connected across said current sensor to sense a voltage signal related to a load current being applied to each of said modules, said transconductance amplifier reading said voltage signal with said one transistor in a conducting state.

2. A controller device according to claim 1, wherein said transconductance amplifier is a track-and-hold type structured to interrupt reading said voltage signal during periods of instability in the working conditions of said DC/DC converter.

3. A controller device according to claim 1, wherein said transconductance amplifier generates an update signal (track) by combining a control signal of said one transistor and a clock signal to each module together through an AND logic operator.

4. A controller device according to claim 1, further comprising an error amplifier having an input terminal connected to said second supply voltage reference, and having an output terminal feedback-connected to another input terminal through a bias resistive element, said error amplifier outputting a triangular PWM signal.

5. A controller device according to claim 4, further comprising a plurality of PWM modulators connected to said output terminal of said error amplifier.

6. A controller device according to claim 5, further comprising a comparator structured to compare the reading by said reading circuit with a reference signal, thereby allowing the current to be checked at each reading cycle.

7. A controller device according to claim 4, wherein a sum of DC values of current readings by said reading circuit each is used for shifting a reference signal of a loop, containing said error amplifier, proportionally to an applied load to each module.

8. A controller device according to claim 4, wherein said DC/DC converter compares current information in each module with a mean value of the currents, thereby correcting a read control voltage of each module and any unbalance between modules, and equalizing the output current values.

9. A controller device according to claim 1, wherein said reading circuit has an output connected to a summing node, said summing node being also input an output voltage Vo(f) from each module and outputting a first order estimate of the load current of said DC/DC converter.

10. A controller device according to claim 9, wherein said summing node is connected to another summing node arranged to be input a reference signal, and that said another summing node is connected to said DC/DC converter through a series of an error amplifier and a PWM modulator.

11. A controller device according to claim 10, wherein said DC/DC converter processes the reading performed by said reading circuit to obtain an error amplifier output voltage in the frequency domain given as:

$$vc(f)=Zf/Zi*vo(f)-Zf*k*\Sigma i\ Rsense*li(f)$$

where:
vs(f) is a control voltage of said PWM modulator,
vo(f) is an output voltage of each module,
Zf is an output-to-inverting terminal impedance of said error amplifier,
Zi is an inverting terminal-to-output voltage impedance of said error amplifier, and
li(f) is a current sampling of said module.

12. A controller device according to claim 10, further comprising an additional compensation network connected between an output terminal of said DC/DC converter and an inverting terminal of said error amplifier to provide a stable DC/DC converter.

13. A voltage/current controller device, comprising:
a first drive transistor connected between a first supply voltage reference and an intermediate circuit node connected to a load;
a second drive transistor connected between the intermediate circuit node and a second supply voltage reference; and
a track-and-hold transconductance amplifier connected to a selected one of the first and second drive transistors, the transconductance amplifier being structured to sense a current though the selected drive transistor during a conducting state of the selected drive transistor and refrain from sensing the current during transition periods of the first and second drive transistors.

14. The controller device of claim 13, further comprising an error amplifier having a first input terminal connected to said second supply voltage reference and an output terminal connected to an output of the transconductance amplifier through a bias resistive element.

15. The controller device of claim 14 wherein the error amplifier includes a second input terminal feedback-connected to the output terminal by the bias resistive element.

16. The controller device of claim 14, further comprising a PWM modulator having an input connected to the output terminal of the error amplifier and an output connected to a DC/DC converter that includes the first and second drive transistors.

17. The controller device of claim 13, wherein the first and second drive transistors comprise a first DC/DC converter module, the controller device further comprising:
a second DC/DC converter module; and
a summing node having a first input connected to an output of the transconductive amplifier, a second input connected to receive an output voltage Vo(f) from each module, and an output that provides a first order estimate of a load current of the first DC/DC converter module.

18. A method of controlling a current imparted to a load using a controller device that includes first and second drive transistors connected between a first and second supply voltage references, the first and second drive transistors being connected to each other at an intermediate circuit node connected to the load, the method comprising:
sensing a current through the first drive transistor during a conducting state of the first drive transistor;
stopping the sensing of the current prior to a conducting state of the second drive transistor;
holding a value of the sensed current during the conducting state of the second drive transistor; and
adjusting duty cycles of the first and second drive transistors based on the held value of the sensed current.

* * * * *

UNITED STATES PATENT AND TRADEMARK OFFICE
CERTIFICATE OF CORRECTION

PATENT NO.    : 6,583,608 B2
DATED         : June 24, 2003
INVENTOR(S)   : Alessandro Zafarana et al.

It is certified that error appears in the above-identified patent and that said Letters Patent is hereby corrected as shown below:

<u>Title page,</u>
Item [30], Foreign Application Priority, number should read as -- MI2000A2042 --.

Signed and Sealed this

Eighteenth Day of November, 2003

JAMES E. ROGAN
*Director of the United States Patent and Trademark Office*